(12) United States Patent
Parsons

(10) Patent No.: US 7,571,596 B2
(45) Date of Patent: Aug. 11, 2009

(54) VACUUM SYSTEM FOR MEMBRANE FUEL STABILIZATION UNIT

(75) Inventor: Douglas A. Parsons, Canton, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 665 days.

(21) Appl. No.: 11/302,910

(22) Filed: Dec. 14, 2005

(65) Prior Publication Data

US 2007/0131110 A1 Jun. 14, 2007

(51) Int. Cl.
*F02C 7/06* (2006.01)
(52) U.S. Cl. ........................ 60/39.08; 60/734
(58) Field of Classification Search .............. 60/39.041, 60/734, 772, 776, 779, 39.08
See application file for complete search history.

(56) References Cited

U.S. PATENT DOCUMENTS

| | | | |
|---|---|---|---|
| 5,615,547 A * | 4/1997 | Beutin et al. ............... | 60/39.08 |
| 6,709,492 B1 * | 3/2004 | Spadaccini et al. ............... | 96/6 |
| 2005/0166597 A1 * | 8/2005 | Spadaccini et al. ............ | 60/776 |
| 2005/0217272 A1 * | 10/2005 | Sheridan et al. ............... | 60/772 |

* cited by examiner

*Primary Examiner*—Michael Cuff
*Assistant Examiner*—Phutthiwat Wongwian
(74) *Attorney, Agent, or Firm*—Carlson, Gaskey & Olds

(57) ABSTRACT

Oil system components for a turbine engine are used to provide a vacuum system for a fuel stabilization unit (FSU). A vacuum system pulls oxygen and other contaminants from fuel into a vacuum chamber within the FSU. The vacuum system pumps the discharge through a vacuum outlet in the FSU toward a vacuum pump. Due to the quality of vacuum required, a two-stage vacuum pump is used. A first stage vacuum pump is an oil system scavenge pump for the turbine engine and the second stage vacuum is provided by a second stage vacuum pump. The discharge flows from the vacuum chamber through to the second stage vacuum pump and is then added to the oil supply. The oil and discharge mixture is sent through an oil system de-oiler and a de-aerator to clean the oil supply prior to pumping the oil back through the oil system.

11 Claims, 2 Drawing Sheets

VACUUM SYSTEM FOR MEMBRANE FUEL STABILIZATION UNIT

BACKGROUND OF THE INVENTION

This invention relates to a vacuum system for incorporating a fuel stabilization unit (FSU) into a turbine engine for use on an aircraft.

It is common practice to use fuel as a cooling medium for various systems onboard an aircraft. The useable cooling capacity of a particular fuel is limited by the formation of insoluble products referred to as "coke". The formation of coke deposits is dependent on the amount of dissolved oxygen present within the fuel due to prior exposure to air. Reducing the amount of oxygen dissolved within the fuel decreases the rate of coke deposition and increases the maximum allowable temperature of the fuel.

FSUs are utilized in turbine engines to remove dissolved oxygen from a fuel supply. One method of removing dissolved oxygen from fuels is using a membrane de-oxygenator. In a membrane de-oxygenator, fuel is pumped along an oxygen permeable membrane. As the fuel passes the membrane a vacuum created on the opposing side of the membrane pulls oxygen and other contaminants out of the fuel and through the membrane. The contaminants pulled from the fuel result in a mixture including oxygenated hydrocarbons. Although the overall level of the discharge is fairly small, the mixture is an environmental safety hazard and cannot be discharged into the atmosphere.

Using an oxygen permeable membrane to remove the dissolved oxygen from the fuel requires the creation of a vacuum within the fuel stabilization unit. Due to the quality of vacuum required, a multi-stage vacuum pump must be used. Multi-stage vacuum pumps are expensive and add to the overall weight of the aircraft. As can be appreciated, space aboard an aircraft is limited and any increase in device size affects overall configuration and operation.

An apparatus and method for creating a vacuum in a fuel stabilization unit and for handing the discharge from a fuel stabilization unit is needed.

SUMMARY OF THE INVENTION

Oil system components for a turbine engine are used to provide a vacuum system for a fuel stabilization unit (FSU).

A fuel system is used in delivering fuel to a gas turbine engine. Fuel passes through the FSU for filtering prior to injection into the engine. Fuel flows through a fuel inlet into a fuel chamber in the FSU. Dissolved oxygen and other contaminants are filtered through an oxygen permeable membrane into a vacuum chamber as a result of vacuum pressure.

A vacuum system pulls discharge from the vacuum chamber through a vacuum outlet, and toward a vacuum pump. Due to the quality of vacuum required a two-stage vacuum pump is needed. A first stage vacuum pump is an oil system scavenge pump for the turbine engine. Utilizing the oil system scavenge pump to provide the first stage vacuum pump reduces the amount of hardware to be added to the engine. The second stage is provided by a second stage vacuum pump. The discharge flows from the vacuum chamber through to the second stage vacuum pump and is added to the oil supply within the oil sump.

Although an environmental hazard that cannot be dumped to the environment, the discharge is minimal when compared with the amount of oil within the oil system. The discharge mixes with the unclean oil that has come from the other engine components. The oil and discharge mixture is sent from the oil sump through a de-oiler and a de-aerator to clean the oil supply prior to pumping the oil back through the oil system. Handling the discharge by using engine components that are already in use eliminates the need of adding equipment to operate the FSU.

These and other features of the present invention can be best understood from the following specification and drawings, the following of which is a brief description.

DETAILED DESCRIPTION OF THE PREFERRED EMBODIMENT

Figure 1:
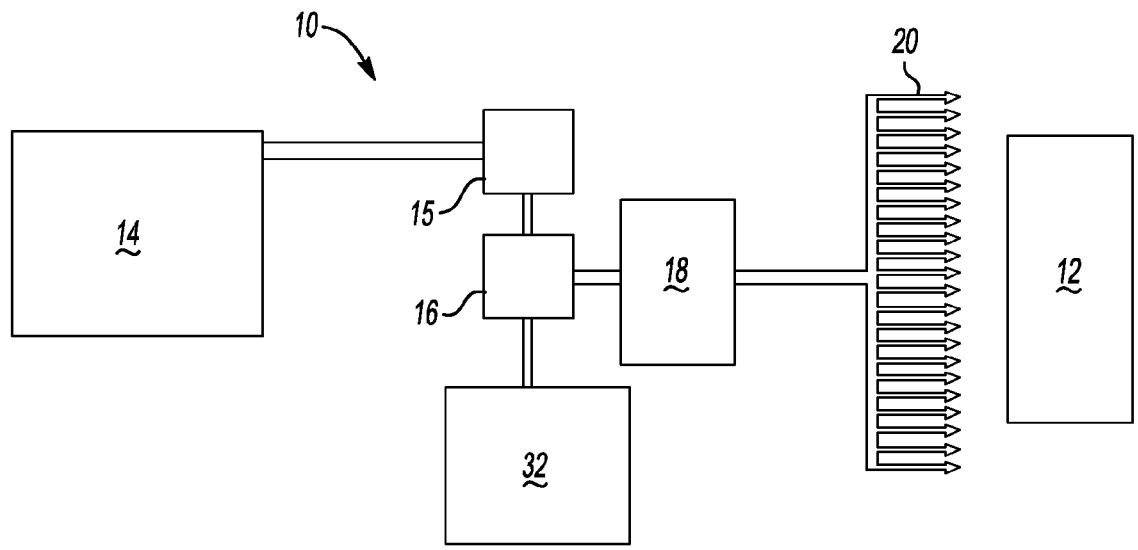
FIG. 1 shows a fuel delivery system for a turbine engine.

A fuel delivery system 10 is shown schematically in FIG. 1. The system 10 is preferably for use in delivering fuel to a gas turbine engine 12. Fuel from a fuel supply 14 passes through a boost pump 15 to a fuel stabilization unit (FSU) 16 for filtering the fuel. The fuel flows from the FSU 16 through a pressure regulator 18 and is discharged from fuel nozzles 20 into the engine 12.

Figure 2:
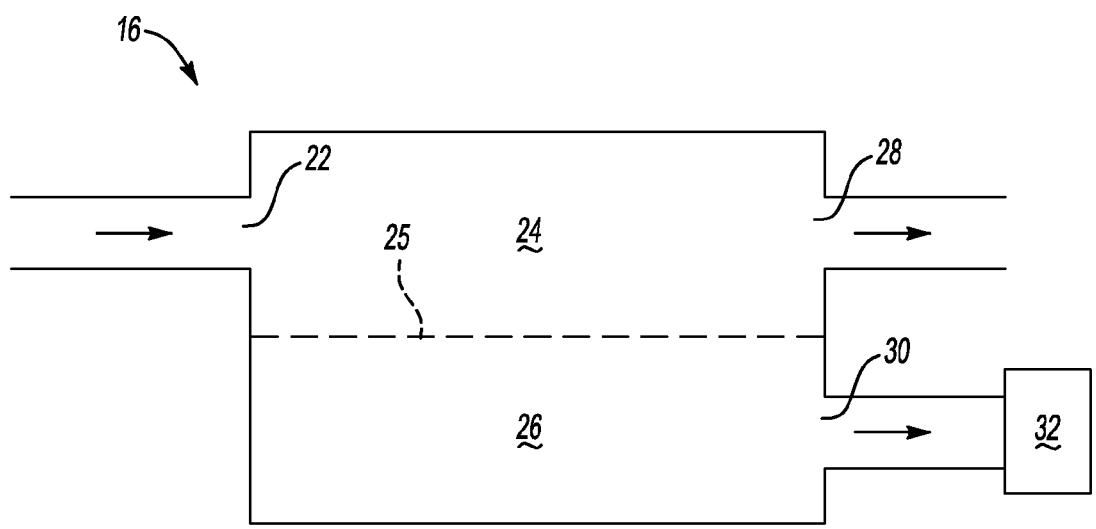
FIG. 2 is a schematic illustration of a fuel stabilization unit.

FIG. 2 schematically illustrates the FSU 16. Fuel flows through a fuel inlet 22 into a fuel chamber 24. Dissolved oxygen and other contaminants are filtered through an oxygen permeable membrane 25 into a vacuum chamber 26 as a result of vacuum pressure created within the vacuum chamber 26. The fuel within fuel chamber 24 flows out of the FSU 16 through the fuel outlet 28 and continues through the system toward the engine 12. Discharge within the vacuum chamber 26 flows out through the vacuum outlet 30 toward a vacuum pump 32.

Figure 3:
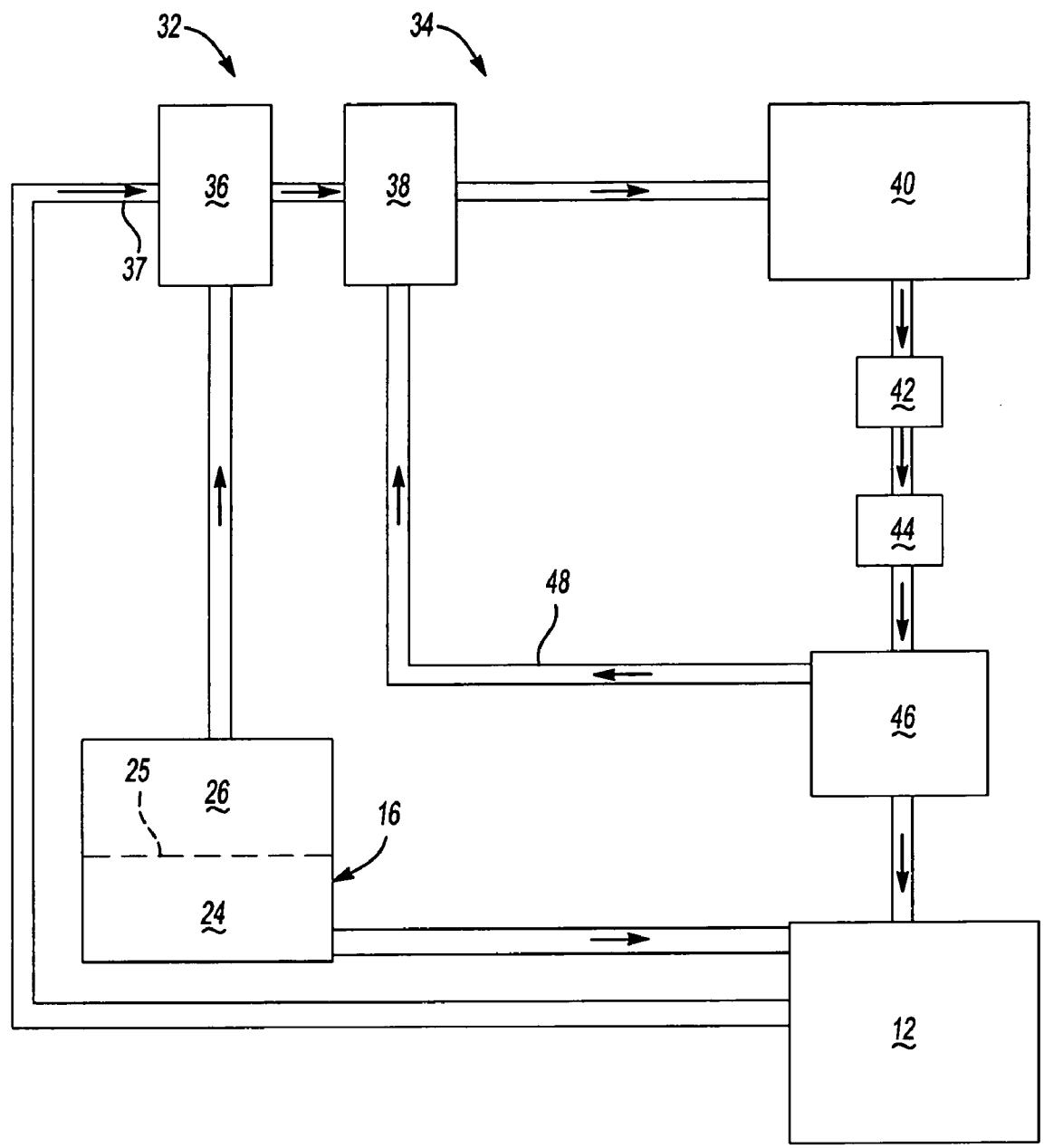
FIG. 3 is a schematic illustration of a vacuum system of the present invention.

FIG. 3 is a schematic view illustrating a vacuum system 34 for use in a turbine engine 12 with the FSU 16 described above. Due to the quality of vacuum required a two-stage vacuum pump 32 is needed. The vacuum system 34 includes a first stage vacuum pump 36 and a second stage vacuum pump 38. The first stage vacuum pump 36 performs as a "hogging" stage and the second stage vacuum pump 38 performs as a "fine" vacuum stage, as is know for multi-stage vacuum pumps. The first stage vacuum pump 36 is an oil system pump or, as shown, an oil system scavenge pump for the turbine engine 12.

The oil system is used to lubricate and cool components of the engine 12. The oil scavenge pump 36 is used to pump oil from the various components of the engine 12 back to an oil sump 40. The connections from the various components of the engine 12 to the oil scavenge pump 36 are illustrated by oil line 37. In the embodiment shown the oil sump 40 is a gearbox, but may be an electronic drive or other method of providing drive to the oil system. The oil supply returned to the oil sump 40 must be cleaned before sending the oil back to the engine 12 components. The oil supply passes through a de-oiler 42 and a de-aerator 44 to clean the oil supply prior to an oil pump 46 sending the oil back through the oil system.

As shown the oil pump 46 sends the cleaned oil to the engine 12 and various components. Also, oil is delivered to the vacuum pump 38 for sealing through line 48. Other components of the engine are connected to the oil system for sealing and cooling. Then the oil system scavenge pump 36 is used to pump the contaminated oil from the various engine 12 components back to the oil sump 40 to be cleaned and cycled again.

The first stage vacuum pump 36 and the second stage vacuum pump 38 pump oil toward the oil sump 40 and create a vacuum within the vacuum chamber 26. The vacuum pulls the dissolved oxygen and other contaminants through the oxygen permeable membrane 25. The discharge flows from the vacuum chamber 26 through to the first stage vacuum pump 36 and second stage vacuum pump 38, where it is added to the oil supply sent to the oil sump 40. The discharge must flow from the vacuum chamber 26 to a lower pressure area within the engine 12. The oil sump 40 actually has a negative pressure for pulling the oil supply in and is an ideal location for adding the discharge to the oil system, although another low pressure area could be utilized.

The volume of the discharge is minimal when compared to the amount of oil within the oil system. The discharge added to the oil supply within the oil sump 40 mixes with the unclean oil that has come from the other components of the engine 12. The oil and discharge mixture is sent from the oil sump 40 through the de-oiler 42 and de-aerator 44 to clean the oil supply prior to pumping the oil back through the oil system. Handling the discharge by using components of the engine 12 that are already in use eliminates the need of adding costly equipment for managing the discharge.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A fuel system, comprising:
   an oil supply system configured to circulate oil;
   a membrane fuel stabilization unit configured to receive fuel, said fuel different than said oil; and
   a vacuum pump connected to said membrane fuel stabilization unit and configured to draw a vacuum on said membrane fuel stabilization unit to remove contaminants from fuel flowing through said membrane fuel stabilization unit, said vacuum pump being part of said oil supply system and configured to circulate oil within said oil supply system.

2. The fuel system of claim 1, comprising another oil pump fluidly arranged between said oil sump and said engine, and a line fluidly interconnecting said another pump and said vacuum pump, wherein said vacuum pump is sealed using oil supplied by said another oil pump through said line.

3. The fuel system of claim 1, wherein said vacuum pump is connected to a gearbox associated with said oil sump, said vacuum pump providing a discharge port configured to discharge contaminants from said vacuum pump.

4. The fuel system of claim 3, wherein a de-oiler and a de-aerator are arranged fluidly downstream from said oil sump and configured to clean said contaminants discharged from said vacuum pump.

5. The fuel system of claim 1, wherein said vacuum pump include two stages including a first stage vacuum and a second stage vacuum arranged fluidly downstream from said first vacuum stage, said first vacuum stage arranged fluidly between said membrane fuel stabilization unit and said second vacuum stage.

6. A turbine engine comprising:
   an engine
   an oil supply system including a pump configured to circulate oil from an oil sump to said engine, and an oil scavenge pump configured to circulated oil from said engine back to said sump;
   a fuel supply system including a membrane fuel stabilization unit configured to receive fuel and remove contaminants from said fuel in response to a vacuum, said membrane fuel stabilization unit configured to supply contaminant-free fuel to said engine, said fuel different than said oil;
   said oil scavenge pump fluidly connected to said membrane fuel stabilization configured to provide said vacuum to said membrane fuel stabilization unit; and
   a discharge of said oil scavenge pump providing said contaminants which intermix with oil being returned to said oil sump through said oil supply system.

7. The turbine engine of claim 6, wherein said oil scavenge pump provides a first stage vacuum pump, and wherein another vacuum pump is fluidly connected downstream of said oil scavenge pump, to provide a second stage vacuum pump.

8. The turbine engine of claim 7, comprising another oil pump fluidly arranged between said oil sump and said engine, and a line fluidly interconnecting said another oil pump and at least one of said vacuum pumps, wherein at least one of said vacuum pumps is sealed using oil supplied by said another oil.

9. The turbine engine of claim 6, wherein a gearbox is associated with said oil sump.

10. The turbine engine of claim 9, wherein said contaminants, which include oxygen, are added to an oil supply in said gearbox.

11. The turbine engine of claim 10, wherein a de-oiler and de-aerator are fluidly arranged between said gearbox and said engine, said de-oiler and said de-aerator configured to clean said contaminants and intermixed oil.

* * * * *

UNITED STATES PATENT AND TRADEMARK OFFICE
CERTIFICATE OF CORRECTION

| | |
|---|---|
| PATENT NO. | : 7,571,596 B2 |
| APPLICATION NO. | : 11/302910 |
| DATED | : August 11, 2009 |
| INVENTOR(S) | : Douglas A. Parsons |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 905 days.

Signed and Sealed this

Seventh Day of September, 2010

David J. Kappos
*Director of the United States Patent and Trademark Office*